(12) United States Patent
Miyanaga et al.

(10) Patent No.: US 7,707,991 B2
(45) Date of Patent: May 4, 2010

(54) INTAKE CONTROL DEVICE FOR INTERNAL COMBUSTION ENGINE

(75) Inventors: Hiroaki Miyanaga, Kariya (JP);
Kazushi Nakashima, Nisshin (JP);
Katsuhiko Nakabayashi, Handa (JP)

(73) Assignee: DENSO CORPORATION, Kariya (JP)

( * ) Notice: Subject to any disclaimer, the term of this patent is extended or adjusted under 35 U.S.C. 154(b) by 287 days.

(21) Appl. No.: 12/068,492

(22) Filed: Feb. 7, 2008

(65) Prior Publication Data
US 2008/0190393 A1 Aug. 14, 2008

(30) Foreign Application Priority Data
Feb. 9, 2007 (JP) ............... 2007-031351
Feb. 14, 2007 (JP) ............... 2007-032944

(51) Int. Cl.
*F02D 1/00* (2006.01)
*F02N 1/00* (2006.01)
(52) U.S. Cl. ................... 123/336; 123/179.18
(58) Field of Classification Search ................ 123/295, 123/298, 305–308, 188.7, 179.18, 336, 442, 123/179.16
See application file for complete search history.

(56) References Cited
U.S. PATENT DOCUMENTS

| | | | | |
|---|---|---|---|---|
| 5,596,957 A | * | 1/1997 | Ichinose et al. | 123/179.18 |
| 5,671,708 A | * | 9/1997 | Ichinose et al. | 123/184.54 |
| 5,676,102 A | * | 10/1997 | Ichinose et al. | 123/179.18 |
| 5,704,324 A | * | 1/1998 | Ichinose et al. | 123/179.18 |
| 6,138,639 A | | 10/2000 | Hiraya et al. | |
| 2004/0260482 A1 | * | 12/2004 | Tanaka et al. | 702/45 |

FOREIGN PATENT DOCUMENTS

JP 3671755 4/2005

* cited by examiner

*Primary Examiner*—John T Kwon
(74) *Attorney, Agent, or Firm*—Nixon & Vanderhye PC

(57) ABSTRACT

An intake control device of an internal combustion engine in which an intake path of each cylinder is partitioned into an upper and a lower path and a tumble control valve and an intake pressure control valve are provided to open/close the upper path and lower path respectively. In a given driving condition, the intake air flow velocity in the lower path is increased by closing the tumble control valve, thereby generating a tumble flow in the combustion chamber. In this process, the intake pressure control valve is opened around start of an intake stroke and closed around its end to make intake pressure downstream of the intake pressure control valve higher than upstream of it to increase the difference between upstream and downstream intake pressures in the intake stroke. This increases the intake air flow velocity in the lower path and intensifies the tumble flow in the combustion chamber.

9 Claims, 6 Drawing Sheets

INTAKE CONTROL DEVICE FOR INTERNAL COMBUSTION ENGINE

CROSS-REFERENCE TO RELATED APPLICATION

This application is based on Japanese Patent Applications NO. 2007-31351 filed on Feb. 9, 2007, and No. 2007-32944 filed on Feb. 14, 2007, the disclosure of which is incorporated herein by reference.

FIELD OF THE INVENTION

The present invention relates to an intake control device for an internal combustion engine which generates a turbulent flow of intake air by means of an air flow control valve provided in an intake path of the engine.

BACKGROUND OF THE INVENTION

Japanese Patent No. 3671755 discloses an intake control device in which the intake port of an internal combustion engine is partitioned into an upper port part and a lower port part by a partition wall. One of these port parts is closed by a tumble control valve to let intake air flow only through the other port part. The flow velocity of intake air is thus increased and a tumble flow (vertical turbulent flow of intake air) is generated in the combustion chamber so as to accelerate homogenization and stratification of air-fuel mixture. The combustion condition is improved and high fuel efficiency and the lower emissions are achieved.

With the increasing tendency toward tighter regulations on fuel efficiency of vehicles, demand for improved combustion conditions of internal combustion engines to enhance fuel efficiency is growing.

In the system with a tumble control valve as described in Japanese Patent No. 3671755, if the tumble flow intensity is increased by increasing the flow velocity of intake air flowing through the open port part, which is referred to as a tumble port part hereinafter, the combustion condition will be further improved and fuel efficiency will be further enhanced.

Generally, as the piston descends during the intake stroke of the internal combustion engine, the intake pressure on the downstream of the tumble control valve decreases and a pressure difference between the intake pressure on the upstream side of the tumble control valve and that on the downstream side is generated. The larger this pressure difference (amount of decrease in intake pressure on the downstream of the tumble control valve relative to the upstream-intake-pressure) is, the higher the flow velocity of intake air in the tumble port part is and the higher the intensity of tumble flow is.

However, the system has the following problem: the tumble port part is always open and the pressure difference between the intake pressure on the upstream of the tumble control valve and that on the downstream thereof cannot be increased sufficiently. It is difficult to increase the flow velocity of intake air flowing through the tumble port part to increase the intensity of tumble flow and, as a consequence, demand for higher fuel efficiency cannot be met sufficiently.

In the system in which a tumble flow is generated in the combustion chamber, the fuel injected from a fuel injector well evaporates during idling after warm-up of the internal combustion engine. The generation of a tumble flow in the combustion chamber is not so effective in improving fuel efficiency and fuel efficiency cannot be improved sufficiently.

SUMMARY OF THE INVENTION

The present invention has been made in view of these circumstances and has an object to provide an intake control device which meets the demand for improved fuel efficiency by increasing the flow velocity of intake air and thus increasing the intensity of intake air turbulent flow in the combustion chamber.

In order to achieve the above object, according to one aspect of the invention, there is provided an intake control device of an internal combustion engine in which an intake path of the internal combustion engine is partitioned into a plurality of subpaths and an air flow control valve is provided to open and close one of the subpaths and a turbulent flow of intake air is generated in an combustion chamber by closing the air flow control valve. The device comprises an opening-closing means which opens and closes one of the plural subpaths which does not have the air flow control valve, and an intake air control means controls intake pressure downstream of the opening-closing means independently of intake pressure upstream of the opening-closing means by controlling the opening-closing means when the air flow control valve is closed. The intake pressure downstream of the opening-closing means is referred to as downstream-intake-pressure hereinafter, and the intake pressure upstream of the opening-closing means is referred to as upstream-intake-pressure hereinafter.

In this structure, since the opening-closing means which opens and closes one of the plural subpaths which has no air flow control valve is provided to control downstream-intake-pressure independently of upstream-intake-pressure by controlling opening and closing of the means while the air flow control valve is closed, the downstream-intake-pressure can be controlled so as to increase the pressure difference between upstream and downstream-intake-pressures. The flow velocity of intake air flowing through the subpath having no air flow control valve can be increased and the intensity of turbulent flow of intake air in the combustion chamber can be increased. The combustion condition can be further improved and higher fuel efficiency can be achieved.

According to another aspect of the invention, there is provided an intake control device of an internal combustion engine in which an intake path of the internal combustion engine is partitioned into a plurality of subpaths and an air flow control valve is provided to open and close one of the subpaths and a turbulent flow of intake air is generated in a combustion chamber by closing the air flow control valve. The device comprises an opening-closing means which opens and closes one of the plural subpaths which has no air flow control valve, and an intake pressure control means performs "downstream-pressure-increase control" by controlling the opening-closing means. While the air flow control valve is closed, the intake pressure downstream of the opening-closing means is higher (lower negative pressure) at least in an intake stroke of the internal combustion engine than in an internal combustion engine without an opening-closing means.

In this structure, since the downstream-intake-pressure (intake pressure downstream of the opening-closing means) in the intake stroke of the internal combustion engine can be made higher than that in an internal combustion engine without an opening-closing means by the downstream-pressure-increase control, the cylinder internal pressure in the intake stroke can be increased (negative pressure is decreased) and pumping loss can be reduced. Consequently, even in a driving condition that a turbulent flow of intake air in the combustion chamber is less effective in improving the combustion condition (for example, during idling after warm-up), pumping loss can be reduced and fuel efficiency can be improved.

BRIEF DESCRIPTION OF THE DRAWINGS

Other object, features and advantages of the present invention will be more apparent from the following detailed description made with reference to the accompanying drawings, in which.

DETAILED DESCRIPTION OF THE PREFERRED EMBODIMENTS

Preferred embodiments of the present invention will be described in detail.

First Embodiment

Figure 1:
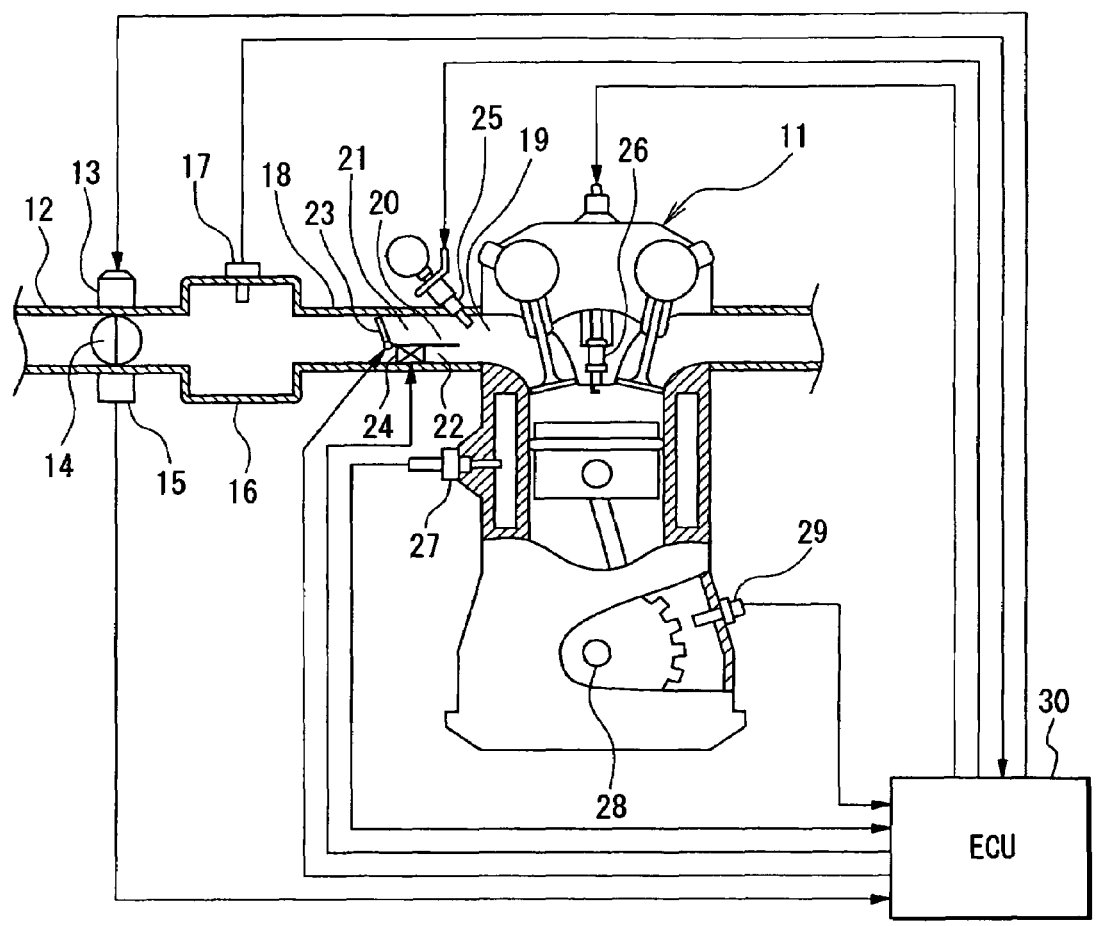
FIG. 1 shows the general structure of an entire engine control system according to an embodiment of the invention.

The general structure of an engine control system will be described referring to FIG. 1.

An internal combustion engine, for example, an in-line four-cylinder engine 11, has four cylinders (cylinders #1 to #4) and upstream of an intake pipe 12 of the engine 11, a throttle valve 14 the opening degree of which is controlled by a motor 13 and a throttle opening sensor 15 which detects the opening degree of the throttle valve 14 are provided.

A surge tank 16 is provided downstream of the throttle valve 14 and an intake pipe pressure sensor 17 for detecting intake pipe pressure is provided on the surge tank 16. An intake manifold 18 which introduces air into each cylinder of the engine 11 and the downstream portion of the intake manifold 18 of each cylinder is connected with the intake port 19 of each cylinder.

In the downstream portion of the intake manifold 18 or intake port 19 of each cylinder, there is provided a partition 20 which partitions the intake path into an upper part and a lower part, so that an upper path 21 (subpath) and a lower path 22 (subpath) are formed by this partition 20. A tumble control valve 23 (air flow control valve) which opens and closes the upper path 21 is provided at the inlet of the upper path 21 of each cylinder and the tumble control valves 23 of all the cylinders are driven by a common motor (not shown). Alternatively, the tumble control valves 23 may be driven by the respective motors for the cylinders.

An intake pressure control valve 24 (opening-closing means) which opens and closes the lower path 22 is provided at the inlet of the lower path 22 of each cylinder. The intake pressure control valve 24 of each cylinder is constituted by an electromagnetic valve and the intake pressure control valves 24 are opened or closed independently on a cylinder-by-cylinder basis. The opening degree of the intake pressure control valve 24 of each cylinder is controlled by controlling the value of current (drive duty) supplied to the intake pressure control valve 24.

A fuel injector 25 is mounted on the downstream of the tumble control valve 23 and intake pressure control valve 24 of each cylinder, and an ignition plug 26 is provided on the cylinder head of the engine 11 for each cylinder so that the air-fuel mixture in each cylinder is ignited by sparking of the ignition plug 26.

The cylinder block of the engine 11 is provided with a cooling water temperature sensor 27 for detecting the cooling water temperature and a crank angle sensor 29 which outputs a pulse signal each time the crankshaft 28 of the engine 11 turns by a prescribed crank angle. The crank angle and engine speed are detected according to the output signal from the crank angle sensor 29.

Signals from these various sensors are sent to a control circuit (hereinafter referred to as "ECU") 30. The ECU 30, mainly composed of a microcomputer, controls the fuel injection quantity of the fuel injector 25 and the ignition timing of the ignition plug 26 by execution of various engine control programs stored in a built-in ROM (storage medium).

The ECU 30 executes a tumble control program (not shown) so that in a given driving condition, the tumble control valve 23 of each cylinder is closed to close the upper path 21 and let the intake air flow only through the lower path 22 and thus the intake air flows more quickly and a tumble flow (vertical turbulent flow of intake air) is generated in the combustion chamber to accelerate homogenization of the air-fuel mixture.

At this time, the ECU 30 executes an intake pressure control program (explained later) shown in FIG. 2 so that while the tumble control valve 23 of each cylinder is closed, by controlling opening and closing of the intake pressure control valve 24 of each cylinder, the intake pressure on the downstream of the intake pressure control valve 24 is controlled independently of the intake pressure on the upstream of the intake pressure control valve 24. The intake pressure in downstream of the intake pressure control valve 24 is referred to as the downstream-intake-pressure, and the intake pressure in upstream of the intake pressure control valve 24 is referred to as the upstream-intake-pressure, hereinafter.

Figure 3:
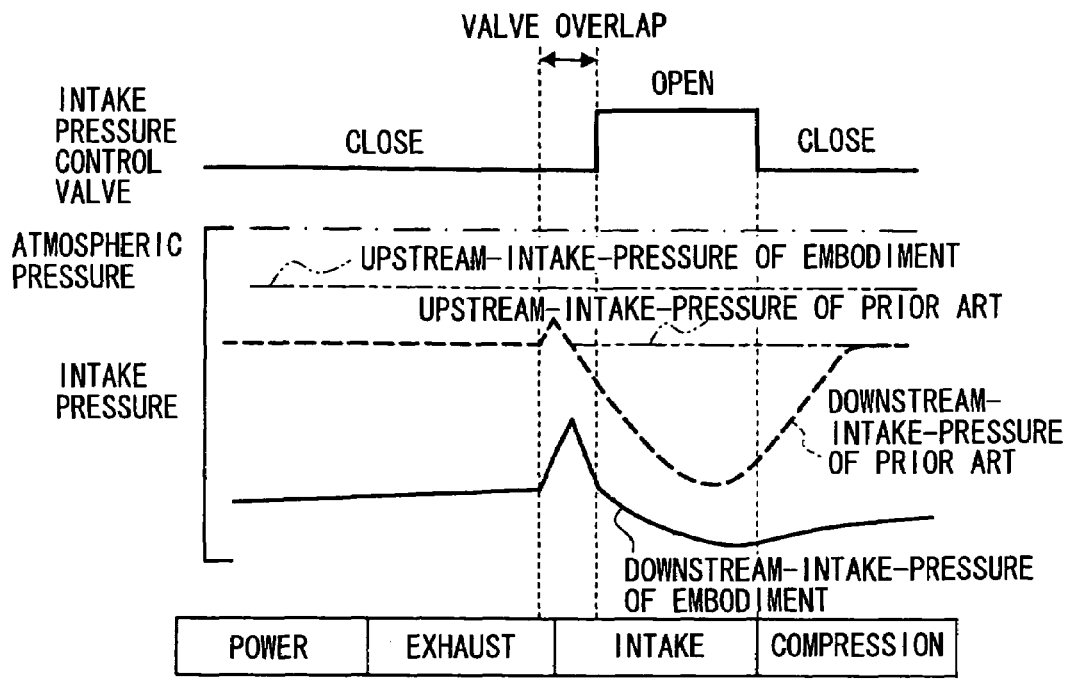
FIG. 3 is a time chart illustrating an example of downstream-pressure-decrease control.

In the first embodiment, as shown in the time chart of FIG. 3, the downstream-pressure-decrease control is carried out by controlling opening and closing of the intake pressure control valve 24 of each cylinder so as to make the downstream-intake-pressure lower than the upstream-intake-pressure at least around the start of the intake stroke of each cylinder of the engine 11 while the tumble control valve 23 of each cylinder is closed. By this downstream-pressure-decrease control, the intake pressure control valve 24 of each cylinder is opened around the start of the intake stroke (for example, 10° CA after intake TDC) and closed around the end of the intake stroke (for example, intake BDC).

As indicated by broken line in FIG. 3, in the conventional system without an intake pressure control valve 24 (system in which the lower path 22 is always open), the downstream-intake-pressure which has dropped during the intake stroke goes up again almost up to the same level as the upstream-intake-pressure after the end of the intake stroke, which means that around the start of the next intake stroke the downstream-intake-pressure is almost the same as the upstream-intake-pressure.

By contrast, in this embodiment, as indicated by solid line in FIG. 3, the intake pressure control valve 24 is closed around the end of the intake stroke to close the lower path 22, which suppresses rise in the downstream-intake-pressure after the intake stroke and keeps the downstream-intake-pressure lower than the upstream-intake-pressure until around the start of the next intake stroke.

As the intake pressure control valve 24 is opened around the start of the intake stroke to open the lower path 22, air is introduced into the cylinder through the lower path 22. At this time, around the start of the intake stroke the downstream-intake-pressure is already lower than the upstream-intake-pressure and therefore when the downstream-intake-pressure goes down with the descent of the piston in the intake stroke, the amount of decrease in intake pressure on the downstream from the level of the upstream-intake-pressure is larger, namely the pressure difference between the upstream and downstream-intake-pressures is larger. Consequently, the flow velocity of intake air flowing through the lower path 22 is increased and the intensity of tumble flow in the combustion chamber is increased.

Figure 2:
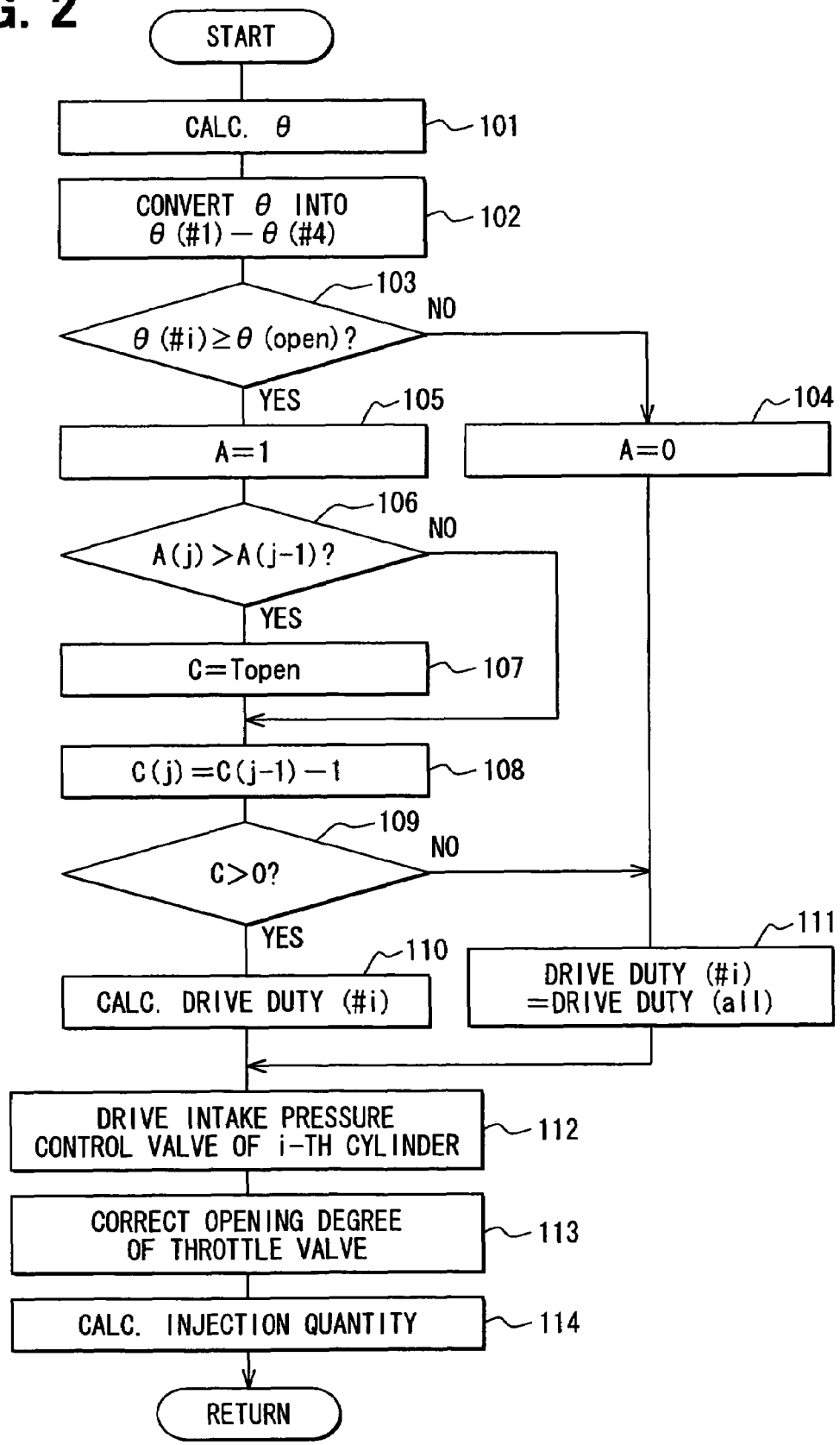
FIG. 2 is a flowchart illustrating the processing sequence of an intake pressure control program according to a first embodiment of the invention.

Referring to FIG. 2, the intake pressure control program executed by the ECU 30 will be explained.

The intake pressure control program shown in FIG. 2 is executed in a given cycle (for example, 1 msec) when the tumble control valve 23 of each cylinder is closed. At Step 101, the current crank angle $\theta$ is calculated according to a signal from the crank angle sensor 29 and then at Step 102, the current crank angle $\theta$ is converted into crank angles $\theta(\#1)$ to $\theta(\#4)$ for the first to fourth cylinders #1-#4. The crank angle $\theta(\#i)$ for the i-th cylinder #i (i=1-4) is a crank angle which depends on the combustion cycle of the i-th cylinder #i (for example, a crank angle in case that the compression TDC of the i-th cylinder #i is 0° CA).

Then, at Steps 103 to 112, opening and closing of the intake pressure control valve 24 of each cylinder is controlled depending on the combustion cycle of the cylinder by controlling opening and closing of the valves 24 depending on the crank angles $\theta(\#1)$ to $\theta(\#4)$ of the cylinders respectively.

At Step 103, a decision is made as to whether the crank angle $\theta(\#i)$ for the i-th cylinder #i is a prescribed valve opening crank angle $\theta$(open) or more. The valve opening crank angle $\theta$(open) is, for example, set at 370° CA (10° CA after intake TDC) or 60° CA (300° CA before intake TDC).

If it is determined at Step 103 that the crank angle $\theta(\#i)$ for the i-th cylinder #i is smaller than the valve opening crank angle $\theta$(open), the sequence proceeds to Step 104 where valve opening flag A is reset to "0" or held. Then, the sequence proceeds to Step 111 where the drive duty (#i) for the i-th cylinder #i to close the intake pressure control valve 24 of the i-th cylinder #i is set to a value equivalent to the duty for fully closing the valve (for example, 10%). The value equivalent to the duty for fully closing the valve is denoted by a drive duty (all) in FIG. 2.

If it is determined at Step 103 that the crank angle $\theta(\#i)$ for the i-th cylinder #i is the valve opening crank angle or more, the sequence proceeds to Step 105 where the valve opening flag A is reset to "1" or held.

Then, at Step 106, whether or not the valve opening flag A has been just changed from "0" to "1" is determined depending on whether the current valve opening flag A(j) is larger than the previous valve opening flag A(j−1). If it is determined that the valve opening flag A has been just changed from "0" to "1", the sequence proceeds to Step 107 where the count of the valve opening counter C is set to the valve opening time for the intake pressure control valve 24, Topen. Here, the valve opening time for the intake pressure control valve 24, Topen, is time required to obtain an adequate quantity of intake air. For example, it is so set as to attain the crank angle for closing the intake pressure control valve 24 around the end of the intake stroke (for example, intake BDC) or attain the crank angle for closing the intake pressure control valve 24 around the start of the intake stroke (for example, 30° CA after intake TDC).

Then, at Step 108, the count of the valve opening counter C is decremented by one and the sequence proceeds to Step 109 where a decision is made as to whether or not the count of the valve opening counter C is larger than "0". If it is determined that the valve opening counter C is larger than "0", the sequence proceeds to Step 110 where the drive duty (#i) for the i-th cylinder #i to open the intake pressure control valve 24 of the i-th cylinder #i is calculated. In this case, the drive duty (#i) for the i-th cylinder #i is calculated according to engine load (for example, intake pipe pressure or intake air quantity) and target revolution speed (for example, target idling speed) by mapping or a mathematical formula or a similar method to set the opening degree of the intake pressure control valve 24 of the i-th cylinder #i.

If it is determined at Step 109 that the count of the valve opening counter C is "0" or less, the sequence proceeds to Step 111 where the drive duty (#i) for the i-th cylinder #i to close the intake pressure control valve 24 of the i-th cylinder #i is set to a value equivalent to the duty for fully closing the valve drive, for example, 10%.

After the drive duty (#i) for the i-th cylinder #i has been thus set, the sequence proceeds to Step 112 where the intake pressure control valve 24 of the i-th cylinder #i is driven at the drive duty (#i) for the i-th cylinder #i. Consequently, the intake pressure control valve 24 of each cylinder is opened around the start of the intake stroke of each cylinder (for example, 10° CA after intake TDC) and closed around the end of the intake stroke of each cylinder (for example, intake BDC), or the intake pressure control valve 24 of each cylinder is closed around the start of the intake stroke of each cylinder (for example, 30° CA after intake TDC).

Then, at Step 113, the opening degree of the throttle valve 14 is adjusted to increase the air flow rate, or made larger than in the system without an intake pressure valve 24 (system in which the lower path 22 is always open) and then at Step 114, the injection quantity of the fuel injector 25 of the i-th cylinder #1 is calculated according to the drive duty for the i-th cylinder #i and target revolution speed (for example, target idling speed) by mapping or a mathematical formula or a similar method.

As explained above, in this embodiment, downstream-pressure-decrease control is carried out in which, while the tumble control valve 23 of each cylinder is closed, the intake pressure control valve 24 of each cylinder is opened around the start of the intake stroke of each cylinder and closed around the end of the intake stroke, so that the downstream-intake-pressure is lower than the upstream-intake-pressure around the start of the intake stroke of each cylinder. When the downstream-intake-pressure goes down upon descent of the piston in the intake stroke, the amount of decrease in intake pressure on the downstream from the level of the upstream-intake-pressure is larger, or the pressure difference between the upstream and downstream-intake-pressures is larger. Consequently, the flow velocity of intake air flowing through the lower path 22 is increased, which increases the intensity of tumble flow in the combustion chamber and improves the combustion condition. Therefore, although the decreased downstream-intake-pressure causes more pumping loss, fuel efficiency is improved.

In a system in which the lower path 22 is opened and closed by the intake pressure control valve 24 while the tumble control valve 23 is closed, the time duration for which the lower path 22 remains open is shorter than in a system without an intake pressure control valve 24 (in which the lower path 22 is always open) and the quantity of intake air may be smaller.

As a solution to this problem, the present embodiment is designed so that in the process of downstream-pressure-decrease control, the opening degree of the throttle valve 14 is made larger than in the system without an intake pressure control valve 24; therefore, even when the time duration for which the lower path 22 remains open is shorter in the process of downstream-pressure-decrease control, an adequate quantity of intake air is obtained. Furthermore, the larger opening degree of the throttle valve 14 increases the upstream-intake-pressure and thus makes the pressure difference between the upstream and downstream-intake-pressures larger during the intake stroke, thereby increasing the tumble flow intensity more effectively.

As shown in FIG. 3, when the intake pressure control valve 24 is opened around the end of the valve overlap period in which the intake valve and the exhaust valve are both open (in other words, the intake pressure control valve 24 is held closed until around the end of the valve overlap period) in the process of downstream-pressure-decrease control, the amount of exhaust gas recirculation (internal EGR) is increased. Consequently, the internal EGR range can be widened or the actual compression ratio can be increased.

Since the pressure difference between the atmospheric pressure and the downstream-intake-pressure can be increased by decreasing the downstream-intake-pressure by the downstream-pressure-decrease control, by taking full advantage of this pressure difference the external EGR range in which some of exhaust gas is flown back into the intake system or the purge range in which the fuel evaporative emission resultant from evaporation of fuel in the fuel tank is introduced into the intake system can be widened. Also, atomization of fuel injected from the fuel injector 25 toward the intake port 19 is encouraged by decreasing the downstream-intake-pressure.

Figure 4:
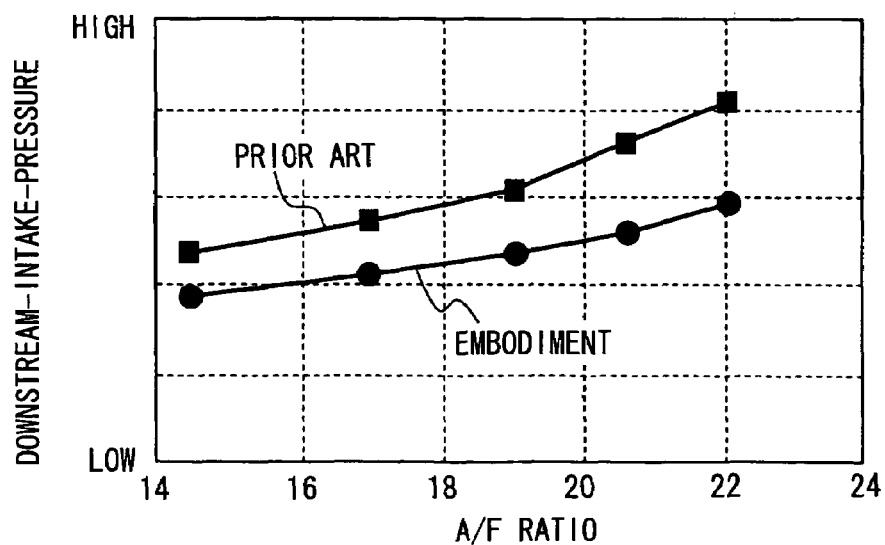
FIG. 4 is a characteristic graph showing the relation between air-fuel ratio and downstream-intake-pressure.
Figure 5:
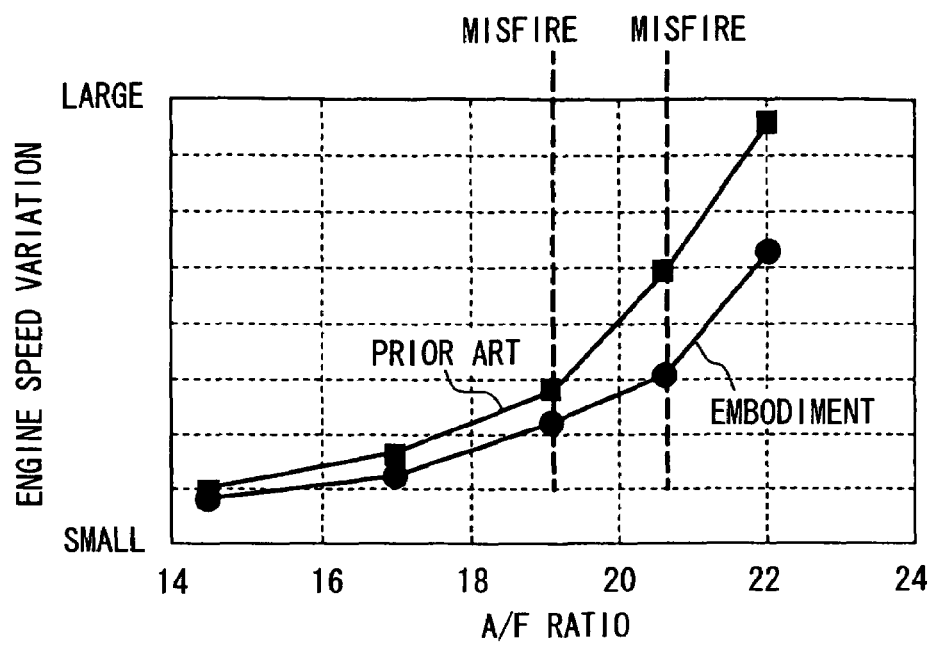
FIG. 5 is a characteristic graph showing the relation between air-fuel ratio and engine speed variation.
Figure 6:
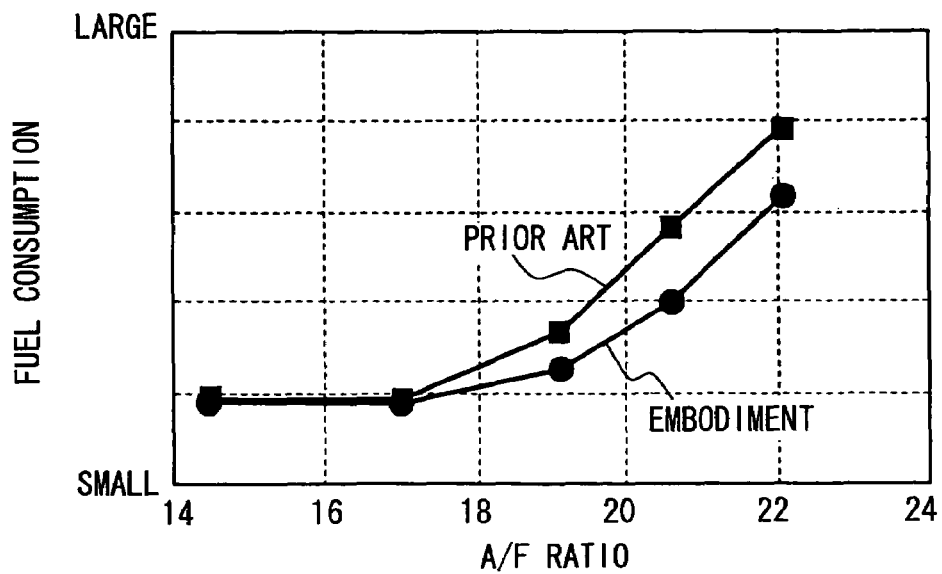
FIG. 6 is a characteristic graph showing the relation between air-fuel ratio and fuel consumption.

As the test results shown in FIGS. 4 to 6 suggest, when the air-fuel ratio is controlled to be lean, if downstream-pressure-decrease control is carried out to make the downstream-intake-pressure around the start of the intake stroke lower than in the conventional system without an intake pressure control valve 24 (system in which the lower path 22 is always open) (see FIG. 4), the lean limit at which misfire occurs due to the increased tumble flow intensity is on the leaner side than in the conventional system (see FIG. 5). This means that the variable valve timing control range or EGR control range can be widened toward the leaner side and fuel efficiency is further improved (see FIG. 6).

In the above explanation of the embodiment, an example of downstream-pressure-decrease control is given on the assumption that the intake pressure control valve 24 of each cylinder is opened after the start of the intake stroke of each cylinder (for example, 10° CA after intake TDC) and closed around the end of the intake stroke of each cylinder (intake BDC). However, time to open or close the intake pressure control valve 24 or the valve opening duration is not limited thereto and for instance, it is also possible that the intake pressure control valve 24 of each cylinder is opened before the start of the intake stroke of each cylinder (for example, 10° CA before intake TDC) or at the time of start of the intake stroke (intake TDC) and closed before or after the end of the intake stroke. The time to open or close the intake pressure control valve 24 or the valve opening duration may be changed as appropriate. The important thing is that opening and closing of the intake pressure control valve 24 of each cylinder should be controlled so as to ensure that the downstream-intake-pressure is lower than the upstream-intake-pressure around the start of the intake stroke of each cylinder.

Second Embodiment

Figure 7:
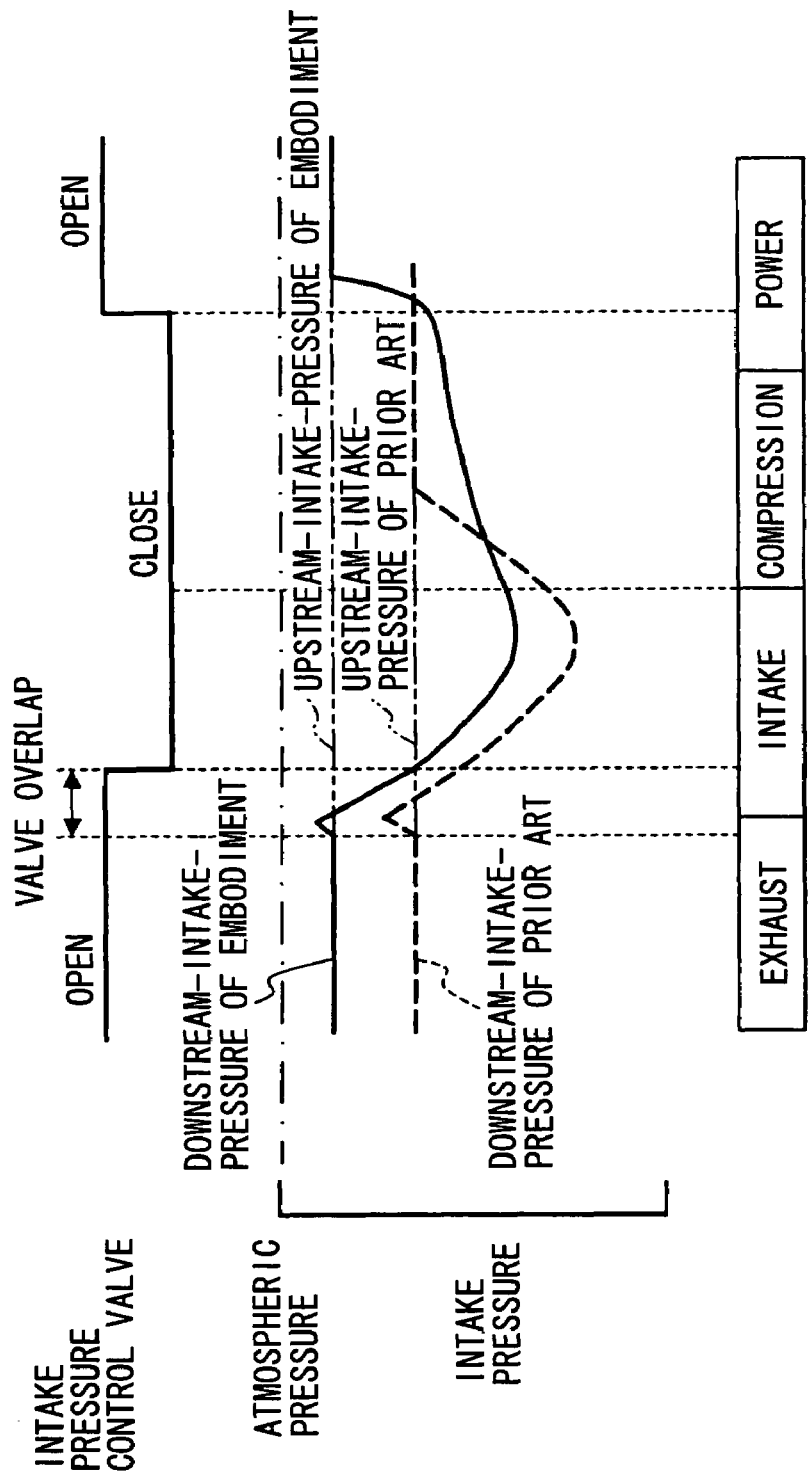
FIG. 7 is a time chart illustrating an example of downstream-pressure-increase control according to a second embodiment of the invention.

In the first embodiment, as shown in the time chart of FIG. 7, downstream-pressure-increase control is carried out by controlling opening and closing of the intake pressure control valve 24 of each cylinder so as to make the downstream-intake-pressure higher than the in the system without an intake pressure control valve 24 (system in which the lower path 22 is always open) at least during the intake stroke of each cylinder of the engine 11 while the tumble control valve 23 of each cylinder is closed. In this downstream-pressure-increase control, the intake pressure control valve 24 of each cylinder is closed around the start of the intake stroke (for example, 30° CA after intake TDC) of the cylinder and opened during the explosion stroke after the end of the intake stroke of each cylinder (for example, 300° CA before intake TDC).

As indicated by solid line in FIG. 7, the intake pressure control valve 24 is closed around the start of the intake stroke to close the lower path 22 and thus the air filled in the intake path on the downstream of the intake pressure control valve 24 is introduced into the cylinder during the intake stroke. At this time, air on the upstream of the intake pressure control valve 24 is not introduced, which suppresses decrease of the upstream-intake-pressure during the intake stroke (increase in negative pressure) and keeps the upstream-intake-pressure at a relatively high level (small negative pressure).

Then, the intake pressure control valve 24 is opened after the end of the intake stroke to open the lower path 22 and thus the intake path on the downstream of the intake pressure control valve 24 is filled with air after the end of the intake stroke. At this time, the downstream-intake-pressure which has dropped during the intake stroke rises to almost the same level as the upstream-intake-pressure kept at a relatively high level and is kept high until around the start of the next intake stroke. This means that the downstream-intake-pressure in the intake stroke is higher than in the conventional system without an intake pressure control valve 24 (broken line in FIG. 7). Consequently, the cylinder internal pressure in the intake stroke is increased and pumping loss is reduced.

Figure 8:
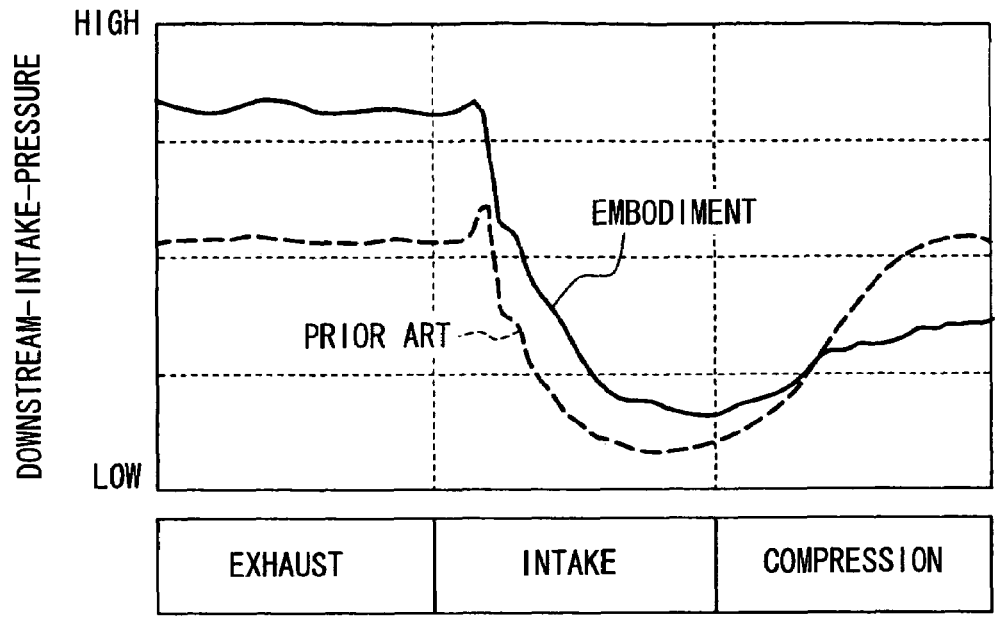
FIG. 8 is a time chart illustrating downstream-intake-pressure behavior.
Figure 9:
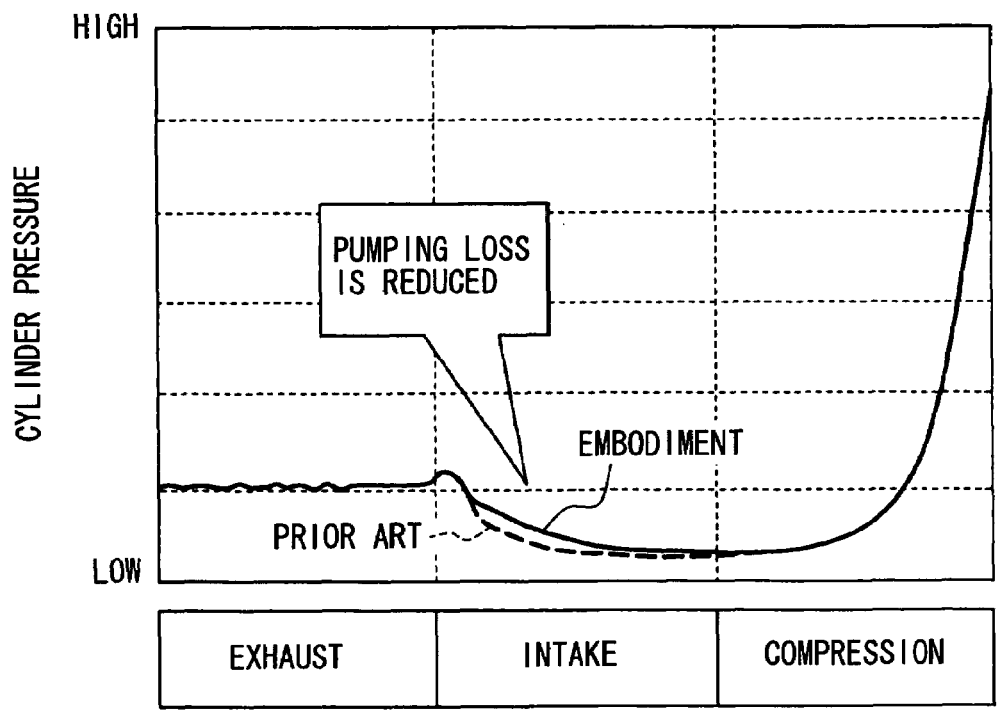
FIG. 9 is a time chart illustrating cylinder internal pressure behavior.

As explained above, in this embodiment, downstream-pressure-increase control is carried out in which, while the tumble control valve 23 of each cylinder is closed, the intake pressure control valve 24 of each cylinder is closed around the start of the intake stroke of each cylinder and opened during the explosion stroke after the end of the intake stroke, so that as shown in FIG. 8, the downstream-intake-pressure in the intake stroke of each cylinder is lower than in the conventional system without an intake pressure control valve 24 (system in which the lower path 22 is always open). Therefore, as shown in FIG. 9, the cylinder internal pressure in the intake stroke is higher than in the conventional system and pumping loss is reduced. Consequently, even in a driving condition that a tumble flow in the combustion chamber is less effective in improving the combustion condition (for example, idling after warm-up), fuel efficiency is improved due to reduction in pumping loss.

In a system in which the lower path 22 is opened and closed by the intake pressure control valve 24 while the tumble control valve 23 is closed, the time duration for which the lower path 22 remains open is shorter than in the system without an intake pressure control valve 24 (system in which the lower path 22 is always open) and the quantity of intake air may be smaller.

As a solution to this problem, this embodiment is designed so that in the process of downstream-pressure-increase control, the opening degree of the throttle valve 14 is larger than in the system without an intake pressure control valve 24; therefore, even when the duration for which the lower path 22 remains open is shorter in the process of downstream-pressure-increase control, an adequate quantity of intake air is obtained. Furthermore, since the larger opening degree of the throttle valve 14 increases the upstream-intake-pressure, the downstream-intake-pressure in the intake stroke can be increased to increase the cylinder internal pressure and pumping loss can be more effectively reduced.

As shown in FIG. 7, when the intake pressure control valve 24 is closed around the end of the valve overlap period (in other words, the intake pressure control valve 24 is held open until around the end of the valve overlap period) in the process of downstream-pressure-increase control, the amount of exhaust gas recirculation (internal EGR) is decreased, leading to improvement in combustion stability.

If the pressure difference between the injection pressure of the fuel injector 25 and the downstream-intake-pressure is large, it is difficult to control very small fuel injection quantities accurately. However, since the pressure difference between the injection pressure of the fuel injector 25 and the downstream-intake-pressure can be decreased by increasing the downstream-intake-pressure by downstream-pressure-increase control, it can become possible to control very small fuel injection quantities accurately and decrease the actual minimum injection time for the fuel injector 25 (actual minimum injection quantity) and achieve a wider dynamic range.

In the above explanation of the embodiment, an example of downstream-pressure-increase control is given on the assumption that the intake pressure control valve 24 of each cylinder is opened in the explosion stroke after the end of the intake stroke of each cylinder (for example, 300° CA after intake TDC) and closed after the start of the intake stroke of each cylinder (for example, 30° CA after intake TDC). However, time to open or close the intake pressure control valve 24 or the valve opening duration is not limited thereto and for instance, it is also possible that the intake pressure control valve 24 of each cylinder is opened in the compression or exhaust stroke after the end of the intake stroke of each cylinder and closed before or at the time of the start of the intake stroke. The time to open or close the intake pressure control valve 24 or the valve opening duration may be changed as appropriate. The important thing is that opening and closing of the intake pressure control valve 24 of each cylinder should be controlled so as to ensure that during the intake stroke of each cylinder, the downstream-intake-pressure is higher than in the system without an intake pressure control valve 24 (system in which the lower path 22 is always open).

Although the above embodiments are examples of application of the present invention to systems in which a tumble flow (vertical turbulent flow of intake air) is generated in the combustion chamber, the invention may be applied to systems in which a swirl flow (horizontal turbulent flow of intake air) is generated.

Although the above embodiments also concern four-cylinder engines according to the present invention, the invention may be applied to engines with three cylinders or less or engines with five cylinders or more.

What is claimed is:

1. An intake control device for an internal combustion engine in which an intake path of the internal combustion engine is partitioned into a plurality of subpaths and an air flow control valve is provided to open and close one of the subpaths and a turbulent flow of intake air is generated in a combustion chamber by closing the air flow control valve, the device comprising:
   an opening-closing means which opens and closes a subpath of the plural subpaths which does not have the air flow control valve; and
   an intake pressure control means which controls a downstream-intake-pressure representing an intake pressure downstream of the opening-closing means independently of an upstream-intake-pressure representing an intake pressure upstream of the opening-closing means by controlling opening and closing of the opening-closing means when the air flow control valve is closed.

2. An intake control device for an internal combustion engine according to claim 1, wherein
   the intake pressure control means executes a downstream-pressure-decrease control in which the opening-closing means is opened/closed in such a manner as to make the downstream-intake-pressure lower than the upstream-intake-pressure at least around start of an intake stroke of the internal combustion engine while the air flow control valve is closed, so that an intensity of the turbulent flow of intake air is increased.

3. An intake control device for an internal combustion engine according to claim 2, wherein
   in the downstream-pressure-decrease control, the intake pressure control means opens the opening-closing means around the start of the intake stroke and closes the opening-closing means around the end of the intake stroke.

4. An intake control device for an internal combustion engine according to claim 2, wherein
   in the downstream-pressure-decrease control, the intake pressure control means makes an opening degree of a throttle valve provided upstream of the opening-closing means larger than in an internal combustion engine without the opening-closing means.

5. An intake control device for an internal combustion engine according to claim 1, wherein
   the opening-closing means is provided in an intake path of each cylinder of the internal combustion engine and the intake pressure control means controls opening and closing of the opening-closing means independently on a cylinder-by-cylinder basis.

6. An intake control device for an internal combustion engine in which an intake path of the internal combustion engine is partitioned into a plurality of subpaths and an air flow control valve is provided to open and close one of the subpaths and a turbulent flow of intake air is generated in a combustion chamber by closing the air flow control valve, the device comprising:
   an opening-closing means which opens and closes a subpath of the plural subpaths which does not have the air flow control valve; and
   an intake pressure control means which executes a downstream-pressure-increase control by controlling opening and closing of the opening-closing means so as to make intake pressure downstream of the opening-closing means higher at least in an intake stroke of the internal combustion engine than in an internal combustion engine without the opening-closing means while the air flow control valve is closed.

7. An intake control device for an internal combustion engine according to claim 6, wherein in the downstream-pressure-increase control, the intake pressure control means closes the opening-closing means around start of an intake stroke and opens the opening-closing means after end of the intake stroke.

8. An intake control device for an internal combustion engine according to claim 6, wherein in the downstream-pressure-increase control, the intake pressure control means makes an opening degree of a throttle valve provided upstream of the opening-closing means larger than in an internal combustion engine without the opening-closing means.

9. An intake control device for an internal combustion engine according to claim 6, wherein the opening-closing means is provided in an intake path of each cylinder of the internal combustion engine and the intake pressure control means controls opening and closing of the opening-closing means independently on a cylinder-by-cylinder basis.

* * * * *